Patented Feb. 23, 1932

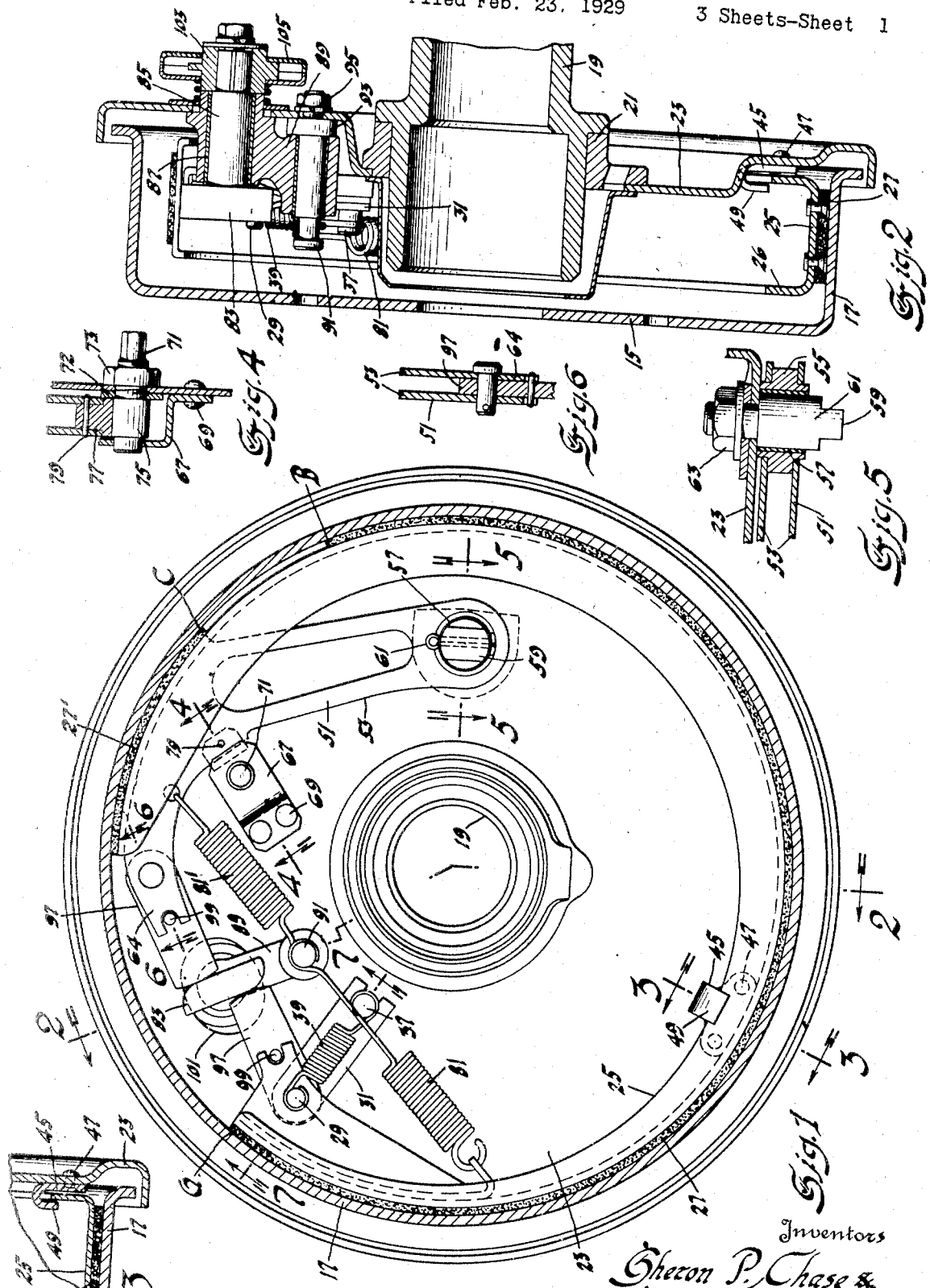

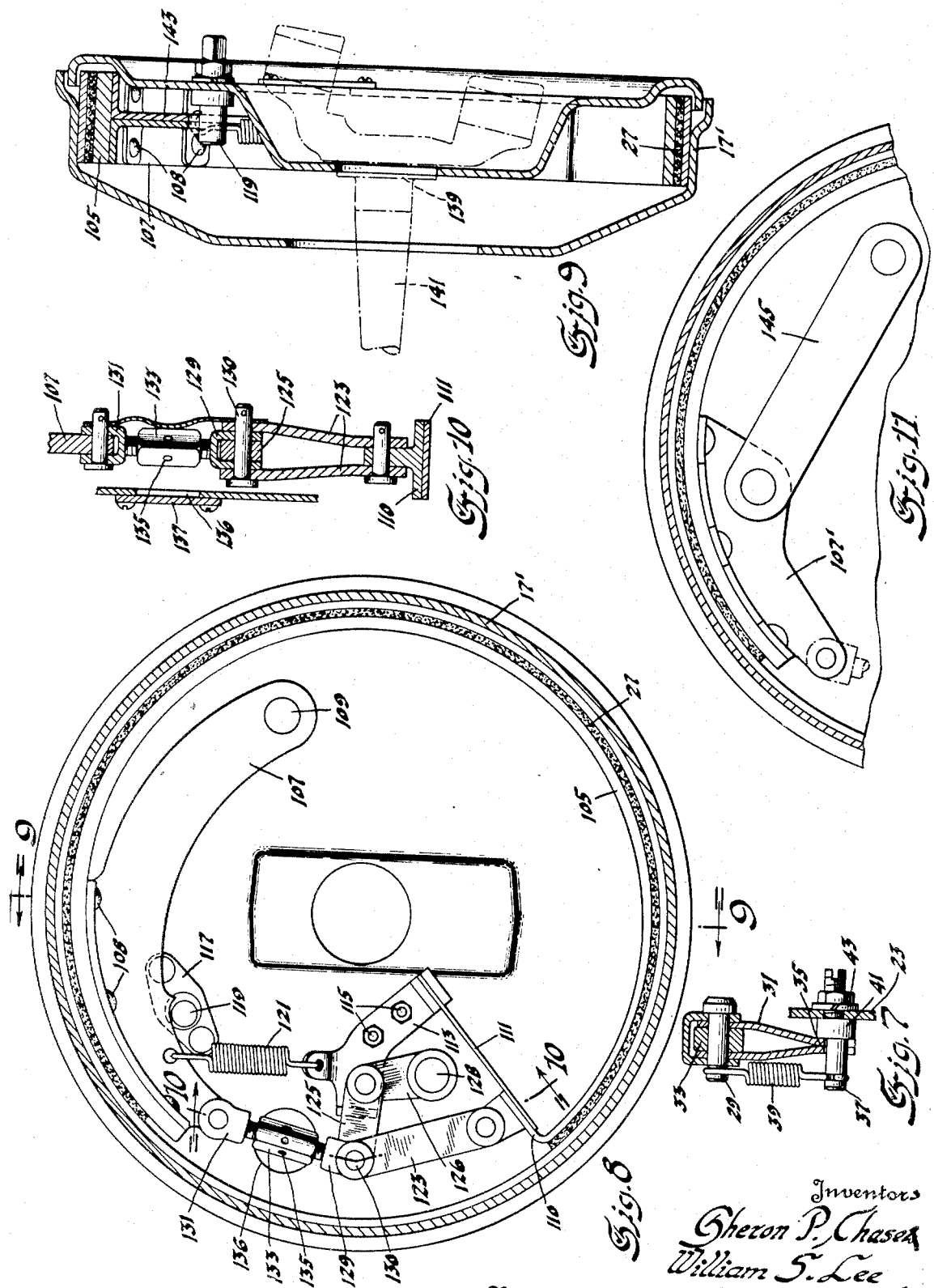

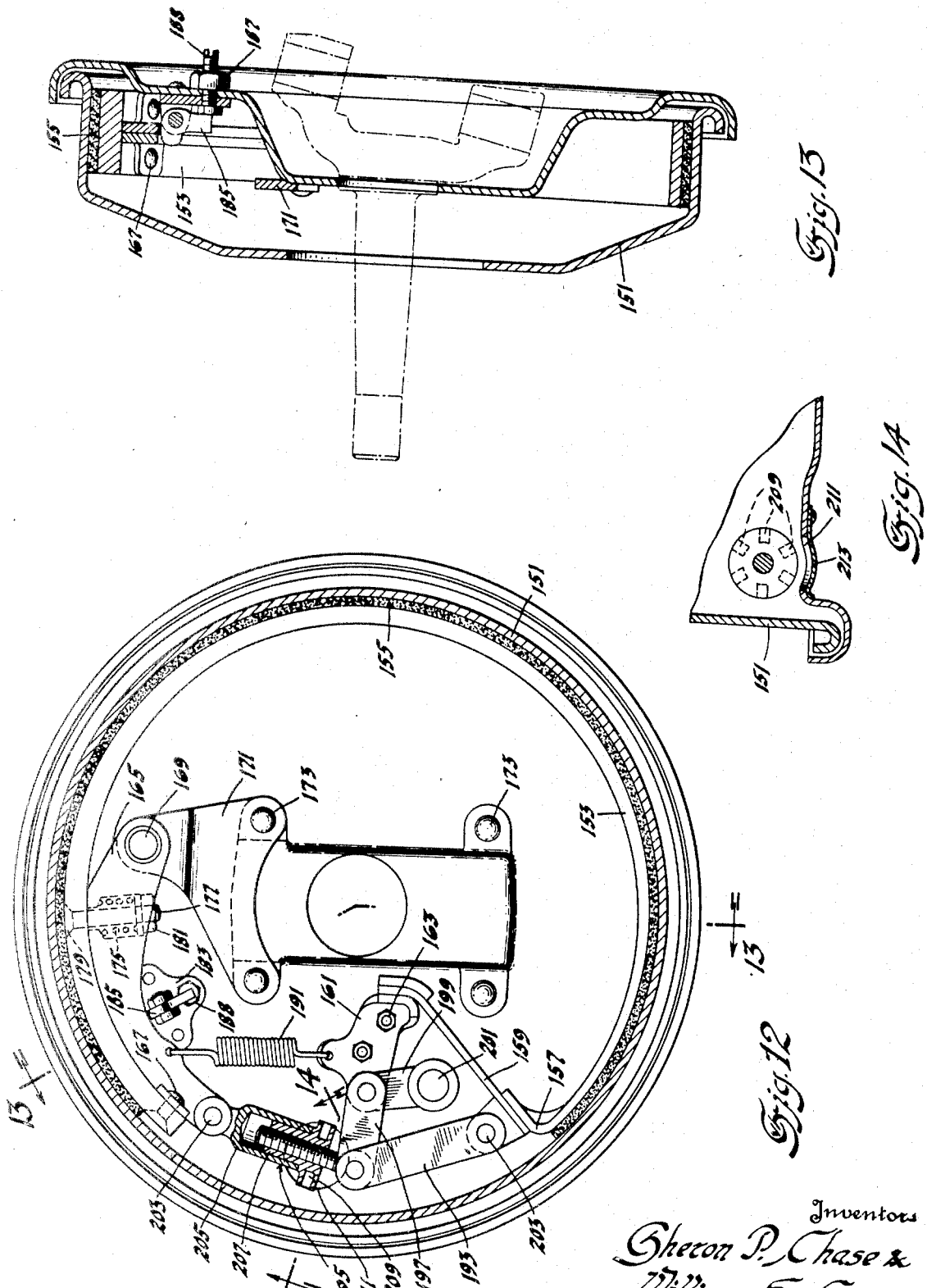

1,846,024

UNITED STATES PATENT OFFICE

THERON P. CHASE, OF ROYAL OAK, AND WILLIAM S. LEE, OF DETROIT, MICHIGAN, ASSIGNORS TO GENERAL MOTORS RESEARCH CORPORATION, OF DETROIT, MICHIGAN, A CORPORATION OF DELAWARE

COMBINATION BAND AND SHOE BRAKE

Application filed February 23, 1929. Serial No. 342,207.

This invention relates to brakes, and has been designed as an improved brake for use on vehicles.

An object of the invention is to provide a brake which shall be effective to check drum rotation in both directions, and one which shall require only moderate pedal pressure.

As a further object, the invention aims to combine a flexible band type of brake with a rigid shoe type in such a way as to secure an exceedingly effective brake action.

As a still further and very important object, the invention aims to make possible an efficient brake at a very low cost.

Other objects and advantages will be appreciated from the following description.

In the drawings:

Figure 1 is a section through a brake drum showing the novel brake means in elevation;

Figure 2 is a section on line 2—2 of Figure 1;

Figure 3 is a section on line 3—3 of Figure 1;

Figure 4 is a section on line 4—4 of Figure 1;

Figure 5 is a section on line 5—5 of Figure 1;

Figure 6 is a section on line 6—6 of Figure 1;

Figure 7 is a section on line 7—7 of Figure 1;

Figure 8 is a section through the drum showing a modified form of brake means in elevation;

Figure 9 is a section on line 9—9 of Figure 8;

Figure 10 is a section on line 10—10 of Figure 8;

Figure 11 shows in elevation a modified form of mounting for a part of the brake means;

Figure 12 is a section corresponding to that of Figure 1 showing in elevation still another form of brake means;

Figure 13 is a section on line 13—13 of Figure 12;

Figure 14 is a section on line 14—14 of Figure 12.

Referring by reference characters to the drawings, and first to Figures 1 to 7 inclusive, numeral 15 represents the head and 17 the flange of a brake drum adapted to be mounted on a vehicle wheel. At 19 is a portion of a rear axle housing, and 21 is a ring secured thereto in any suitable way, and to which ring is attached a plate 23, this being the plate commonly called the backing plate. This backing plate closes the open side of the drum, and serves as an anchor for the brake means which is to engage the drum flange, and check the rotation of the drum and the wheel to which it is secured. It is through this backing plate that the rotating shaft for applying the brake is extended.

The brake means for engaging the drum is novel. It comprises a band member 25, more or less flexible, and extending continuously around the drum from a position adjacent one side of the actuating cam to a position near the other side of the cam. This band, in the form of the invention illustrated in Figures 1 to 7, is of channel shape in section. The depth of the channel flanges 26 increases from one end of the band to a position near the other end of the band, as shown in the drawings. A brake lining 27 is secured by rivets, as usual, to the web of the channel. This lining 27 extends from the free end of the band, as at $a$, to a point $b$ spaced from the other end. At the free end $a$, a pin 29 passes through the channel flanges. This pin also passes through a pair of links 31 and a spacer 33 within the channel. The links extend radially inward, and are bent into contact as at 35. These inner ends are slotted to engage a pin 37 mounted in the backing plate. A spring 39 connects pin 29 with pin 37 to hold the free end of the band off the drum when the brake is released, the clearance being determined by the engagement of pin 37 in the slotted ends of the links 31. Adjustment of this clearance may be made by making pin 37 eccentric relative to its axis of rotation in an opening in the backing plate, as shown in Figure 7. The axial position of the pin is fixed by flange 41 and a nut 43.

As best shown in Figure 3, there is a guide 45 secured as at 47 to the backing plate, the guide having a U-shaped end 49 engaging over one of the band flanges. This prevents transverse movement of the brake means.

Figure 5 illustrates the pivotal mounting for a rigid shoe 51. This shoe is made of two plates 53. At the pivot flanged spacer 55 is provided with a bushing 57 and mounted on a pivot bolt 59. A cotter pin 61 is used to retain the assembly in position. This pivot bolt passes through the backing plate 23 and is secured by a nut 63. The brake shoe members 53 extend within the flanges of the band at its end and extend beyond the end thereof in the form of slotted extremities 64. The shoe members 53 may be received in openings in the band web, and be secured to the band in any suitable way. A lining 27' is secured at the end of the band, extending from the extreme end to a point designated by $c$.

Figure 4 shows an adjustable stop to determine the clearance at the shoe end of the brake means. This may comprise an angular plate 67 secured to the backing plate by rivets 69. Rotatable in the plate 67 and the backing plate 23 is a pin 71 held by a washer 72 surrounding the pin and engaging one side of the backing plate, and an adjustable nut 73 on the outer side. The pin is provided with an eccentric 75 designed to engage an abutment 77 held by fastening means 79 to the shoe plates 53. Releasing springs 81, 81' hold the brake means off the drum and in contact with their abutments. The brake may be operated by a cam 83 having a camshaft 85. A bushing 87 journals this shaft in a swinging link 89 pivoted at 91 to the backing plate, there being a spacing member 93 and a nut 95 for the pivot pin 91. It is upon this pin that the adjacent ends of springs 81 and 81' are mounted. The cam acts upon rockers 97 pivoted between the flanges of the band and the plates 53 of the shoe. Pins 99 carried by the rockers limit the swinging movement of the rockers about their pivot by engagement with the walls of the slots at the end of the shoe and at the end of the band. The opening 101 in the backing plate is of such dimensions as to provide for the swinging movement of link 89. Rotation of the camshaft may be effected by an element 103 secured to the camshaft outside the backing plate, and a lever arm, shown in section at 105, which may be adjustably secured to the element 103 in any desired manner.

In the operation of braking it may be assumed that the drum is rotating in a counter-clockwise direction when the vehicle moves forward. When, now, the cam is rotated it tends to expand the end of the band and of the shoe into contact with the drum. The action of the cam at the free end of the band is supplemented by the rotary effect of the drum tending to carry the band with it. This wrapping is effective throughout the major portion of the band to a point near the shoe and substantially represented by $b$. As this wrapping is increasingly effective around the band from its free end, the band is provided with flanges of increasing radial extent to accommodate the greater applied forces. At the shoe end of the drum rotation tends to carry the shoe away from the drum and to rotate it counter-clockwise about its pivot 59 and into contact with a stop 67. Since this applied force is more effective than the force applied by the cam tending to rotate shoe 51 in a counter-clockwise direction, the shoe actually does swing counter-clockwise away from the drum and into contact with its stop 67. This rigid shoe, therefore, acts as an anchor for the band, the effective force of the cam functioning solely to apply the band to the drum, the band being, as will be readily understood, substantially full wrapping. To check the rotation of the drum in its reverse direction, the floating cam operates to expand both the shoe and the cam into drum contact. In this case, the band is less efficient since the drum tends to unwrap it from drum contact. The cam pressure on the shoe, however, is supplemented by a self-actuating force caused by the action of the rotating drum upon the shoe. In this case, the cam may swing bodily to some extent, there being a clockwise rotation of link 89 to accommodate the self-actuation of the rigid shoe. Upon release of the force applied to the brake means through the cam, the releasing springs return the brake means to initial position.

Figure 8 shows a somewhat modified form. In this form the flange 17' is engaged by the lining 27 carried by a flexible band 105 substantially rectangular in cross section and tapering in its radial dimension as before. A shoe 107 is secured to the band at its thicker end by fastening means 108. This shoe is pivoted to the backing plate at 109. At the free end of the band is a radial extension 110 to which is secured a flexible strip 111 suitably anchored at a position near the center of the drum to a plate 113 secured to the backing plate by fastening means 115. This resilient strip 111 determines by its length the clearance at the free end of the band. It yields when the brake is applied and by its resiliency restores the free end of the brake to its initial position after brake action. It also serves to prevent any possible grabbing of the brake by severe contact at the free end. Plate 117 carries an eccentric stop 119, and a releasing spring 121, connected to the shoe 107 and to plate 113, holds the shoe end of the brake means in released position. The brake may be applied by a toggle. This toggle comprises, first, a pair of links 123 pivoted to the end of the band and to a link 125. It also includes an adjustable link between the link 125 and the shoe. This adjustable link comprises a member 129 pivoted on the pin 1 which joins the links 123 and the link 125. It also includes a member 131 pivoted to the shoe. The members 129 and 131 have threaded stems engaged by a rotatable member 133. The member 133 has a series of openings 135 which may be engaged by a tool projected through an opening 136 in the backing plate. This latter opening may be covered by a cover plate 137.

In the illustration the brake is shown as used on a front wheel knuckle 139 provided with a spindle 141 for a front wheel. The brake shoe 107 is shown in Figure 9 as composed of two angular plates 143. In this case the operation is substantially the same as in the form already described. Counter-clockwise rotation is checked by a full wrapping band extending to a point adjacent the heel of shoe 107. The shoe is then off the drum, the rotating drum carrying it to its stop 119. The shoe then serves as an anchor for the full wrapping band. The reverse motion is checked by the shoe and band, both being expanded against the drum by the toggle. In this case, the shoe is a self-actuating force supplementing the pedal pressure. The band tends to unwrap this unwrapping force acting against the pedal pressure. The movement of the link 125 may be effected by an arm 126 carried by a suitable shaft, not shown, journaled in the backing plate at 128.

Figure 11 shows a minor modification of the brake means. In this form an articulated link 145 is pivoted to a shoe 107' and to the backing plate. In other respects the structure is substantially the same. The function of the articulated link 145 is to insure conformity with the drum.

Figures 12, 13 and 14 show still another form, this form being designed to obtain an even greater, more complete full wrapping action. In this form the drum 151 is engaged by a band 153 varying in width as before. This band is provided with a lining 155. At one end the band is inturned as at 157 and secured thereto as a resilient blade 159 corresponding to the blade 111 of the form shown by Figure 8. This blade is fixedly secured at its inner end to a plate 161 held by fastening means 163. At the other end of the band, the thicker end, is secured a rigid shoe 165 by fastening means 167. It is noted, however, in this case that the fastening means is at the toe end of the shoe only, the band being not positively connected with the shoe at its heel. The shoe is pivoted at 169 to a plate 171 fastened as at 173 to the backing plate. Near the heel of the shoe is a recess containing a spring 175 in abutment with the bottom of the recess. A bolt 177 has its head in a countersink 179 on the outer face of the band, and passes through the shoe recess and is encircled by spring 175. A nut 181, together with a washer, forms the abutment for the other end of the spring. To serve as a stop for the shoe, a plate 183 is secured to the backing plate. To this plate 183 is pivoted a two-arm lever 185. One arm of the lever is designed to engage the shoe, and the other arm is variably positioned to secure the desired shoe clearance. This positioning means comprises a threaded stud 188 held in adjusted position by a nut 187. A spring 191 connects the shoe 165 with plate 161 and serves to hold the shoe against its stop when the brake means is released, and also when the full wrapping band is in action. The brake may be applied by a toggle comprising links 193 and 195. The adjacent ends of these links are pivoted to a link 197, the latter pivoted at its other end to an arm 199 carried by an operating shaft, not shown, extending through the backing plate at 201. Links 193 and 195 are pivoted to the end of the band and to the shoe by pivot means 203. The toggle link 195 may have its part pivoted to the shoe in the form of a hollow member 205. Rotatably supported in this hollow member is a tubular stem 207, this stem being in threaded engagement with that part of link 195 which is pivoted to link 193. The member 207 constitutes an adjusting member, and for the purpose of adjustment its head flange has a plurality of openings 209 which may be engaged by a suitable tool projecting through an opening in the backing plate 211 normally closed by a cover 213. In this form of the invention the band is self-wrapping all the way to the toe of the shoe, the spring 175 yielding to permit the band to so operate. When the brake is released the spring 175 functions to hold the band against the heel of the shoe. In stopping reverse action here, as before, the band tends to unwrap, and the shoe becomes self-actuating.

We claim:

1. In combination, a drum, brake means to engage the drum comprising a band designed to be substantially full wrapping for one direction of drum rotation, and a shoe having a fixed pivot and attached at one end of said band designed to be self-actuating to check the reverse direction of drum rotation.

2. In combination, a drum, a self-wrapping band, a rigid shoe secured to one end of said band to constitute an anchor for the band when the other end of the band is expanded into drum contact, means operably engaging said band and shoe to apply the brake.

3. In combination, a drum, a flexible band, a rigid shoe secured adjacent one end of the band, pivot means for rotatably mounting said shoe, means operably engaging the adjacent ends of said shoe and said band to apply the brake whereby a full wrapping band checks the drum rotation in one direction and a self-actuating shoe serves to check rotation in the opposite direction.

4. The invention defined by claim 3, said band being of increasing rigidity toward the shoe end.

5. In combination, a drum, a flexible band, a rigid shoe having a fixed pivot, a stop to at times limit rotation of said shoe about its pivot, said shoe being secured at one end of said band, actuating means operably associated with the adjacent ends of the band and shoe whereby drum rotation in one direction is checked substantially wholly by the wrapping band, and in the other direction by the joint action of an unwrapping band and self-actuating shoe.

6. The invention set forth in claim 5, said band being of channel shape in cross section.

7. The invention as set forth in claim 5, said actuating means comprising a floating cam, and means carried by said shoe and band engaging said cam.

8. In combination, a rotatable drum, a fixed plate, a substantially full wrapping band in said drum, a rigid shoe pivotally anchored to said fixed plate and peripherally attached to an end of said band, a stop to limit the rotation of said shoe, actuating means extending through said fixed plate and operably associated with the adjacent ends of said band and shoe whereby drum rotation in one direction is checked by the wrapping band, the shoe providing the band anchor, and whereby the self-actuating shoe together with the band may serve to check reverse drum rotation.

9. The invention defined by claim 8, said actuating means being circumferentially movable.

10. In combination, a drum, brake means to engage the drum and check its rotation, said brake means comprising a wrapping band and a rigid shoe secured to one end of said band, said shoe being pivotally mounted, a stop to limit the rotation of said shoe, operating means associated with the adjacent ends of the shoe and band whereby rotation of the drum is checked by the wrapping band, the shoe rotating away from the drum under the influence of said drum into contact with said stop, and serving as an anchor for said band, and whereby opposite rotation of said drum may be checked by manual pressure applied to said shoe and self-actuation caused by the rotating drum, the band being simultaneously applied to the drum against the unwrapping force caused by drum rotation.

In testimony whereof we affix our signatures.

THERON P. CHASE.
WILLIAM S. LEE.